United States Patent
Bulatow et al.

(10) Patent No.: US 9,735,642 B2
(45) Date of Patent: Aug. 15, 2017

(54) ROTOR FOR A ROTATING ELECTRIC MACHINE

(71) Applicant: Continental Automotive GmbH, Hannover (DE)

(72) Inventors: Michael Bulatow, Berlin (DE); Knut Welke, Falkensee (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 467 days.

(21) Appl. No.: 14/373,577

(22) PCT Filed: Jan. 23, 2013

(86) PCT No.: PCT/EP2013/051235
§ 371 (c)(1),
(2) Date: Jul. 21, 2014

(87) PCT Pub. No.: WO2013/110656
PCT Pub. Date: Aug. 1, 2013

(65) Prior Publication Data
US 2015/0028711 A1    Jan. 29, 2015

(30) Foreign Application Priority Data

Jan. 26, 2012 (DE) .................... 20 2012 000 842 U
Feb. 16, 2012 (DE) .................... 20 2012 003 120 U

(51) Int. Cl.
| H02K 3/48 | (2006.01) |
|---|---|
| H02K 3/52 | (2006.01) |
| H02K 1/24 | (2006.01) |
| H02K 1/26 | (2006.01) |
| H02K 3/487 | (2006.01) |

(52) U.S. Cl.
CPC ............ *H02K 3/527* (2013.01); *H02K 1/24* (2013.01); *H02K 1/265* (2013.01); *H02K 3/487* (2013.01)

(58) Field of Classification Search
CPC .............................. H02K 3/487; H02K 1/26
USPC ....................................... 310/194, 214–215
See application file for complete search history.

(56) References Cited

U.S. PATENT DOCUMENTS

| 3,008,786 A | 11/1961 | Costello ................ 310/214 |
| 3,311,511 A | 3/1967 | Goller ................... 148/597 |
| 3,480,810 A | 11/1969 | Potter ..................... 310/54 |
| 3,991,152 A | 11/1976 | Santi et al. ............. 264/161 |

(Continued)

FOREIGN PATENT DOCUMENTS

| CH | 203736 A | 3/1939 | ............ H02K 3/51 |
| CH | 620060 A5 | 10/1980 | ............ H02K 3/487 |

(Continued)

OTHER PUBLICATIONS

Chinese Office Action, Application No. 201380006877.5, 13 pages, Feb. 3, 2016.

(Continued)

*Primary Examiner* — Thanh Lam
(74) *Attorney, Agent, or Firm* — Slayden Grubert Beard PLLC

(57) ABSTRACT

A rotor for a rotating electric machine includes a plurality of pole teeth supporting an excitation winding, grooves respectively formed between the pole teeth, and wedges provided in the grooves, each wedge having a concave shape with a bulge oriented towards the inside of the rotor.

13 Claims, 5 Drawing Sheets

(56) References Cited

U.S. PATENT DOCUMENTS

| | | | |
|---|---|---|---|
| 4,147,946 A | 4/1979 | Linscott, Jr. et al. | 310/214 |
| 4,149,101 A | 4/1979 | Lesokhin et al. | 310/214 |
| 4,413,405 A | 11/1983 | Doke et al. | 29/596 |
| 4,933,583 A | 6/1990 | Ripplinger | 310/156.22 |
| 5,036,238 A | 7/1991 | Tajima | 310/214 |
| 5,127,148 A | 7/1992 | Lykes et al. | 29/596 |
| 5,498,916 A | 3/1996 | Lindner et al. | 310/214 |
| 5,684,352 A | 11/1997 | Mita et al. | 310/456.56 |
| 5,838,080 A | 11/1998 | Couderchon et al. | 310/49.33 |
| 5,973,432 A * | 10/1999 | Katagiri | H02K 1/24 29/596 |
| 6,190,465 B1 | 2/2001 | Coutu et al. | 148/315 |
| 6,222,286 B1 | 4/2001 | Watanabe et al. | 310/49.36 |
| 6,225,723 B1 * | 5/2001 | Cooper | H02K 1/24 310/214 |
| 6,350,324 B1 | 2/2002 | Waeckerle et al. | 148/311 |
| 6,759,771 B2 * | 7/2004 | Doherty | H02K 1/325 310/214 |
| 6,933,648 B2 | 8/2005 | Buchan et al. | 310/214 |
| 7,687,963 B2 * | 3/2010 | Klaussner | H02K 3/487 310/214 |
| 7,743,498 B2 | 6/2010 | Rhodes | 29/888.3 |
| 7,875,132 B2 | 1/2011 | Pandey | 148/415 |
| 8,237,318 B2 | 8/2012 | Ikitake et al. | 310/68 B |
| 8,536,746 B2 | 9/2013 | Kuhnen et al. | 310/72 |
| 8,729,887 B2 | 5/2014 | Suzuki et al. | 324/207.16 |
| 2003/0184180 A1 * | 10/2003 | Doherty | H02K 3/527 310/214 |
| 2003/0193256 A1 * | 10/2003 | Liebermann | H02K 9/22 310/194 |
| 2005/0212373 A1 | 9/2005 | Mcdowall et al. | 310/214 |
| 2005/0231058 A1 | 10/2005 | Down et al. | 310/192 |
| 2007/0120429 A1 * | 5/2007 | Howard | H02K 1/32 310/61 |
| 2008/0238237 A1 | 10/2008 | Nishihama et al. | 310/166 |
| 2010/0041939 A1 | 2/2010 | Siess | 600/16 |
| 2010/0102910 A1 | 4/2010 | Waeckerle et al. | 335/297 |
| 2010/0141056 A1 | 6/2010 | Miyahara et al. | 310/30 |
| 2013/0147307 A1 | 6/2013 | Morooka et al. | 310/215 |

FOREIGN PATENT DOCUMENTS

| | | | |
|---|---|---|---|
| CN | 1220050 A | 6/1999 | H01F 27/28 |
| CN | 1873035 A | 12/2006 | B22D 21/00 |
| CN | 101031744 A | 9/2007 | F16J 15/32 |
| CN | 101680070 A | 3/2010 | C22C 19/00 |
| CN | 102055295 A | 5/2011 | H02K 11/00 |
| DE | 1925625 A1 | 3/1970 | H02K 9/19 |
| DE | 2817951 A1 | 12/1978 | H02K 1/24 |
| DE | 3808311 A1 | 9/1989 | H02K 1/27 |
| DE | 3901230 C1 | 7/1990 | H02K 15/12 |
| DE | 19623460 A1 | 12/1997 | H02K 15/14 |
| DE | 69904367 T2 | 10/2003 | C21D 6/00 |
| DE | 19808659 B4 | 3/2004 | H02K 15/12 |
| DE | 69721671 T2 | 3/2004 | C22C 38/00 |
| DE | 10244201 A1 | 4/2004 | H02K 15/00 |
| DE | 60010167 T2 | 8/2005 | C22C 30/00 |
| DE | 102005030877 A1 | 1/2007 | H02K 3/487 |
| DE | 602004005631 T2 | 12/2007 | H02K 3/487 |
| DE | 102007014224 A1 | 9/2008 | A61M 1/10 |
| DE | 202009008646 U1 | 11/2010 | H02K 11/00 |
| DE | 102009023691 A1 | 12/2010 | G01B 7/30 |
| DE | 112009000845 T5 | 4/2011 | H02K 11/00 |
| DE | 102009046716 A1 | 5/2011 | H02K 1/27 |
| DE | 102009051979 A1 | 6/2011 | H02K 11/00 |
| EP | 0543280 B1 | 5/1993 | H02K 3/487 |
| EP | 0562534 A1 | 9/1993 | H02K 1/06 |
| EP | 0889488 A1 | 1/1999 | C21D 6/00 |
| EP | 1005135 A1 | 5/2000 | H02K 1/24 |
| EP | 1967289 A2 | 9/2008 | B05D 7/14 |
| EP | 2113988 A1 | 11/2009 | H02K 15/16 |
| EP | 2296256 A2 | 3/2011 | H02K 3/52 |
| GB | 2339798 A | 2/2000 | H01F 1/147 |
| JP | 9322457 A | 12/1997 | H02K 3/487 |
| JP | 2002112488 A | 4/2002 | H02K 21/14 |
| WO | 2013/110580 A1 | 8/2013 | H02K 3/487 |
| WO | 2013/110652 A1 | 8/2013 | H02K 11/00 |
| WO | 2013/110656 A1 | 8/2013 | H02K 3/487 |

OTHER PUBLICATIONS

Chinese Office Action, Application No. 201380006876.0, 12 pages, Aug. 17, 2016.
U.S. Non-Final Office Action, U.S. Appl. No. 14/373,503, 26 pages, Nov. 3, 2016.
Chinese Office Action, Application No. 201380006876.0, 12 pages, Feb. 16, 2016.
International Search Report and Written Opinion, Application No. PCT/EP2013/051231, 12 pages, Jun. 3, 2013.
International Search Report and Written Opinion, Application No. PCT/EP2013/051235, 11 pages, Jun. 3, 2013.
International Search Report and Written Opinion, Application No. PCT/EP2013/051085, 11 pages, Jun. 4, 2013.
Chinese Office Action, Application No. 201380006878.X, 14 pages, May 20, 2016.
Chinese Office Action, Application No. 201380006878.X, 13 pages, Jan. 25, 2017.
Chinese Office Action, Application No. 201380006876.0, 12 pages, Jan. 25, 2017.
U.S. Notice of Allowance, U.S. Appl. No. 14/373,605, 33 pages, Dec. 27, 2016.
Chinese Office Action, Application No. 201380006877.5, 12 pages, dated Apr. 5, 2017.

* cited by examiner

ROTOR FOR A ROTATING ELECTRIC MACHINE

CROSS-REFERENCE TO RELATED APPLICATIONS

This application is a U.S. National Stage Application of International Application No. PCT/EP2013/051235 filed Jan. 23, 2013, which designates the United States of America, and claims priority to DE Application No. 20 2012 000 842.0 filed Jan. 26, 2012 and DE Application No. 20 2012 003 120.1 filed Feb. 16, 2012, the contents of which are hereby incorporated by reference in their entirety.

TECHNICAL FIELD

The present invention relates to a rotor for a rotating electric machine, in particular for an electric motor or a generator. In addition, a method for manufacturing such a rotor is disclosed.

BACKGROUND

Electric motors are increasingly installed in modern motor vehicles. Said electric motors are used in this context, in particular, as drive motors which are fully integrated in the drive train or, for example, as starter generators or axle-mounted motors in hybrid applications. In this context, partially externally excited synchronous machines are used which have a rotor composed of a laminated core provided with an exciter winding. In such rotors, grooves are formed between the wound pole teeth.

During operation, high centrifugal forces, which can pull the exciter winding out of the grooves, occur both in the case of internal rotors as well as in the case of external rotors. The centrifugal forces are dependent on the rotational speed and on the weight of the groove-internal components. In particular in the case of revving up machines the winding is therefore additionally secured after assembly. For this purpose, various bonding agents are known which are used as impregnating resins or casting compounds.

In addition, groove stoppers or groove wedges can be used in order to prevent the winding dropping out of the groove. Such groove wedges are known, for example, from document DE 28 17 951 A1. In the case of rotors which are configured for electric motors with a high rotational speed (10,000 revolutions per minute and more) it would be appropriate to secure the groove-internal components, in particular the exciter winding, even more effectively against centrifugal forces which occur during operation.

SUMMARY

One embodiment provides a rotor for a rotating electric machine, which comprises a number of pole teeth which support an exciter winding; grooves are formed between each of the pole teeth; and groove wedges are provided in the grooves, wherein the groove wedges have a concave shape with a bulge which is directed toward the interior of the rotor.

In a further embodiment, the groove wedges have a constant curvature radius.

In a further embodiment, the groove wedges are clamped tight in a dimensionally stable fashion on their longitudinal sides in the pole teeth.

In a further embodiment, the groove wedges have a seal on their longitudinal side.

In a further embodiment, a sealing plug is provided between at least one end of the groove wedges and adjoining rotor components.

In a further embodiment, the sealing plug has flexible lamellas.

In a further embodiment, the exciter winding is surrounded by a casting compound or an impregnating compound.

Another embodiment provides an electric motor having a rotor as disclosed above.

Another embodiment provides a motor vehicle having an electric motor having a rotor as disclosed above.

BRIEF DESCRIPTION OF THE DRAWINGS

Example embodiments of the invention are discussed below with reference to the drawings, in which.

DETAILED DESCRIPTION

Figure 1:
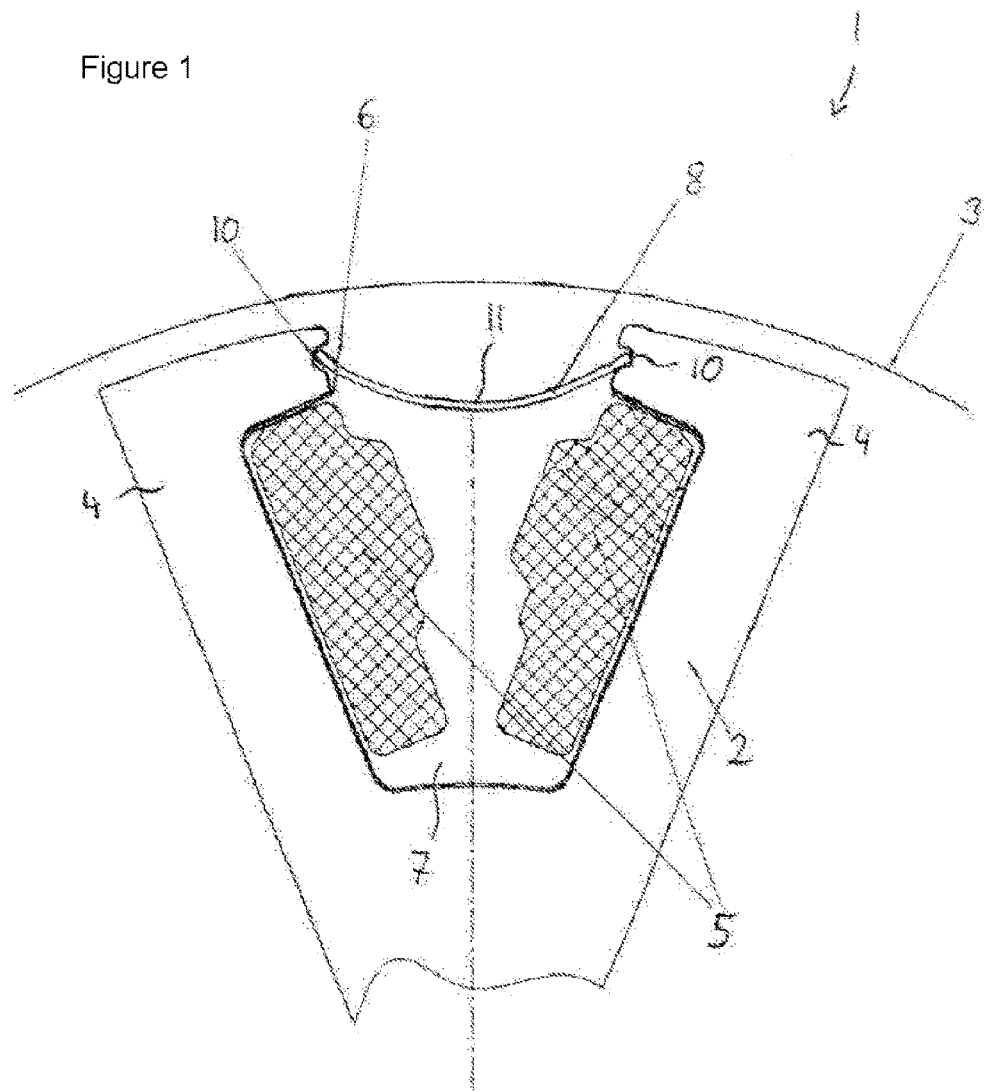
FIG. 1 is a schematic view of a cross section through an electric motor according to one embodiment.

Embodiments of the disclosure a rotor for a rotating electric machine whose exciter winding is fixed with respect to centrifugal forces in such a way that the rotor can also be used for high rotational speeds.

According to one embodiment, a rotor is specified for a rotating electric machine, which rotor has a number of pole teeth which support an exciter winding. Grooves are formed between each of the pole teeth, and groove wedges are provided in the grooves. The groove wedges have a concave shape with a bulge which is directed toward the interior of the rotor.

Such a rotor is also suitable for high rotational speeds of 10,000 revolutions per minute and more. A groove wedge which is shaped in such a way secures the groove-internal components particularly well since the centrifugal forces can be conducted away better with a concavely curved groove wedge.

In one embodiment, the groove wedges have a constant curvature radius. They therefore form an arc in cross section.

In one embodiment, the groove wedges are clamped tight in a dimensionally stable fashion in the pole teeth. For this purpose, recesses are provided as securing means in the pole teeth, which recesses can be shaped in accordance with the shape of the groove wedges and hold the edge sections of the groove wedges. Recesses which are shaped in this way follow the shape of the groove wedges and support the effect of the concave groove wedge shape.

In order to provide the seal during the casting, the boundary face between the groove wedges and the pole teeth can have a seal, for example in the form of a silicone or adhesive bead. Such a sealing bead can be applied either to the groove wedges or into the recesses in the pole teeth before or during the assembly of the groove wedges. Said sealing bead seals the groove wedges over their entire longitudinal sides.

A seal in the form of a sealing plug can also be provided between at least one end of the groove wedges and adjoining rotor components. In this context, the sealing plug can have flexible lamellas.

In one embodiment, the exciter winding is surrounded with a casting compound. For this purpose, after the assembly of the rotor, after the windings have been applied and groove wedges have been mounted the electrically insulating casting compound, for example a casting resin or epoxy resin such as araldite or a plastic, is introduced into the cavities inside the grooves of the rotor and cures. In one embodiment, the cavities inside the grooves are filled essentially completely with a casting compound.

In such rotors, the groove-internal components, in particular the exciter winding, are particularly well secured against centrifugal forces which occur during operation.

Alternatively, the exciter winding can also be surrounded with an impregnating compound, for example an impregnating resin. During impregnation, the rotor is dipped into the impregnating compound and subsequently dried. In this context, all the groove components are bonded together and the rest of the impregnating compound drips off. The rotor grooves are typically not completely filled in this context.

According to one embodiment, an electric motor having the rotor described is specified. The electric motor can be embodied, in particular, as an externally excited synchronous machine. It can be embodied either as an internal rotor or as an external rotor.

Since the groove-internal components are effectively secured against centrifugal forces which occur, the electric motor can be configured for rotational speeds of 10,000 revolutions per minute and more.

Such electric motors are suitable for use in a motor vehicle. They can be used either as drive motors which are fully integrated in the drive train or, for example, as starter generators, wheel hub motors or axle-mounted motors. According to one aspect of the invention, a motor vehicle is therefore specified having a drive which has the described electric motor. The motor vehicle can be embodied here as an electric vehicle or hybrid vehicle.

Other embodiments provide a method for manufacturing the rotor is specified, wherein the method comprises the following method steps:
  providing a rotor laminated core with exciter windings and groove wedges which cover the grooves;
  fitting sealing cushions onto the outer sides of the groove wedges, wherein the sealing cushions cover the outer sides of the groove wedges completely;
  introducing the rotor into a casting tool;
  casting the rotor; and
  taking the rotor out of the casting tool and removing the sealing cushions.

The use of the sealing cushions makes it possible to effectively prevent the casting compound from escaping from the interface between the pole teeth and the groove wedge. The casting compound is therefore also prevented from reaching the surface of the groove wedges. For a particularly good sealing effect, sealing cushions composed of an elastic material, for example a temperature-resistant silicone, can be used, which sealing cushions are compressed when they are placed into the casting tool.

Advantageous refinements of the rotor presented above are also to be considered advantageous refinements of the electric motor or of the motor vehicle insofar as they can also be transferred to the electric motor or to the motor vehicle.

FIG. 1 is a schematic view of a cross section through an electric motor 1 having a rotor 2 which is embodied as a laminated core, and a stator 3 which surrounds the rotor 2.

The rotor 2 has a number of pole teeth 4 which are separated from one another by grooves 7. The pole teeth 4 support exciter windings 5 which are electrically insulated with respect to the pole teeth 4, for example by means of a groove insulating paper 6. It is also possible to use some other type of insulation, for example encapsulation by injection molding with a plastic.

The groove 7 is also closed off from the outside by a groove wedge 8. The groove wedge 8 is embodied from a non-magnetizable material.

The groove wedge 8 has in this embodiment a material which essentially has the alloy composition $Fe_{Rem}Cr_aNi_b\text{-}Mn_cC_dSi_eP_fS_gN_h$, wherein a, b, c, d, e, f, g and h are given in percent by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

Compared to known "Nirosta" steels this material has a particularly high proportion of chromium and nickel. As has become apparent, materials made of this steel continue to be non-magnetizable even after shaping, punching or cutting. Eddy current losses in the groove wedge 8 are therefore avoided.

The groove wedge 8 has a concave shape with a bulge 11 toward the interior of the rotor 2. The curvature radius of the groove wedge 8 is constant over its entire cross section. With its edge regions the groove wedge 8 is held and secured in recesses 10 in the pole teeth 4.

The concave shape of the groove wedge 8 conducts away centrifugal forces which occur during operation. The groove wedge 8 therefore secures the groove-internal components, in particular the exciter windings 5, additionally in the groove 7 even in the case of high rotational speeds of the electric motor 1.

Figure 2:
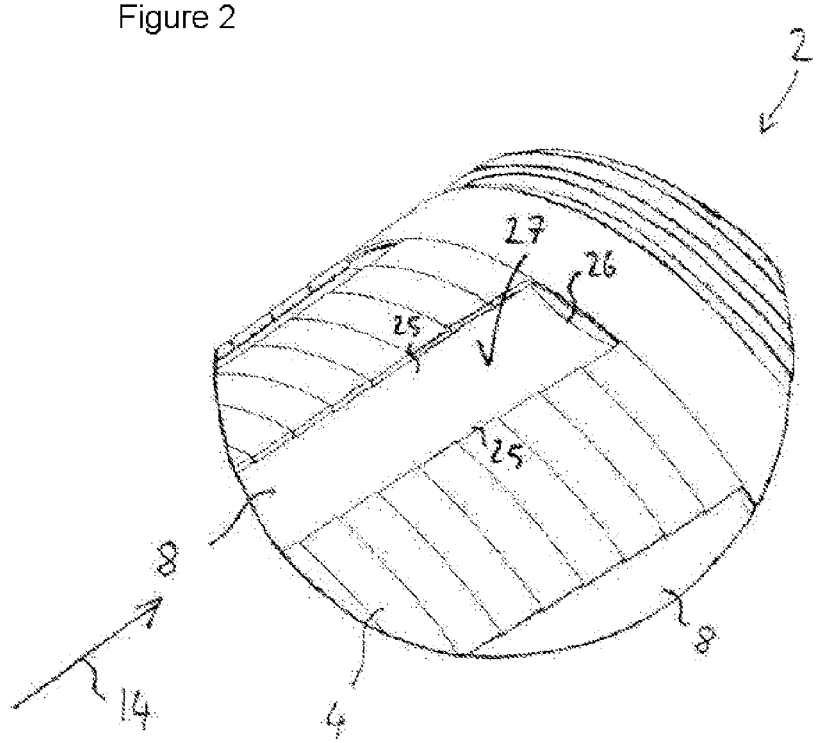
FIG. 2 is a schematic view of a perspective view of the electric motor according to figure 1.

FIG. 2 shows a perspective view of the rotor 2. In this view, the groove wedges 8 which extend between the pole teeth 4 can be seen. The groove wedges 8 extend axially, that is to say in the direction of the arrow 14 parallel to the rotational axis of the rotor 2, over the entire length of the groove 7. In the case of an oblique groove which is frequently used to reduce the cogging torque of electric motors, the groove wedges follow the oblique profile of the groove 7 correspondingly.

The groove wedges 8 are assembled after the exciter windings 5 have been applied. They can be assembled either axially or radially. In this context, both unbent pieces of sheet metal—for example unwound from the coil and shaped during assembly—as well as parts which are already shaped before assembly are used. After assembly of the groove wedges 8, the remaining cavities of the grooves 7 are filled with a casting compound (not shown).

Figure 3:
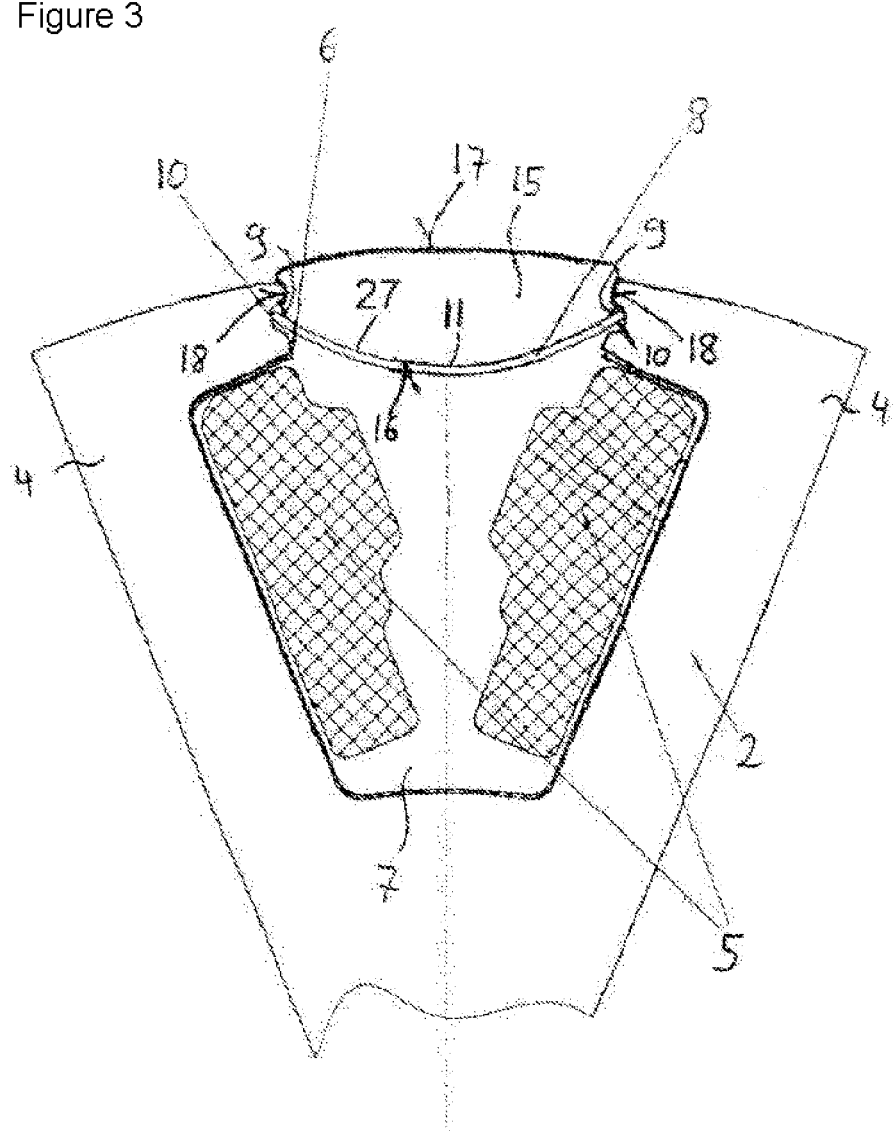
FIG. 3 is a schematic view of the use of a sealing cushion during the casting of the rotor.

FIG. 3 illustrates the sealing of the rotor 2 during casting. Revving up rotors are frequently cast with a casting compound in order to stabilize the groove-internal components. Since rotor parts are to be as far as possible cast evenly without air occlusions, the rotor 2 which is already assembled is cast in a vacuum.

In the region of the groove wedges 8, a sealing cushion 15 is provided in order to prevent the casting compound from escaping, said sealing cushion 15 simulating with its shape the contour of the groove wedge 8 on the rotor side and a round shape on the casting tool side. The sealing cushion 15 can be shaped and dimensioned in such a way that it forms the seal in all directions: On its surface 16 with respect to the concave groove wedge 8, on its surface 17 with respect to the casting tool (not shown), at its side faces 18 with respect to the pole teeth 4. In particular, the sealing cushion 15 can have undercuts 9 with which it latches or wedges into the recess 10.

Due to the geometry and the flexibility of the sealing cushion 15, both straight and oblique grooves 7 can be sealed in this way.

The casting tool is generally an open and closed tool composed of two sealing faces which are round on the inside and which form a hollow cylinder after the closing of the tool. The rotor 2 is accommodated inside the hollow cylinder.

In the embodiment shown, the sealing cushions 15 are not flush with the outside of the rotor 2 but rather protrude slightly. When the tool is closed, the sealing cushions 15 which are made of flexible materials seal off the region of the groove wedge 8 radially. As a result of the pressing when the tool is closed, the sealing cushion 15 extends in the direction of the longitudinal axis of the rotor 2. This also results in a sealing effect in the axial direction in the region of the cover of the winding head 21. The sealing regions (radial and axial) are also illustrated in figure 4.

The sealing cushion 15 can also be used during impregnation in order to prevent impregnating resin from escaping from the grooves 7.

Figure 4:
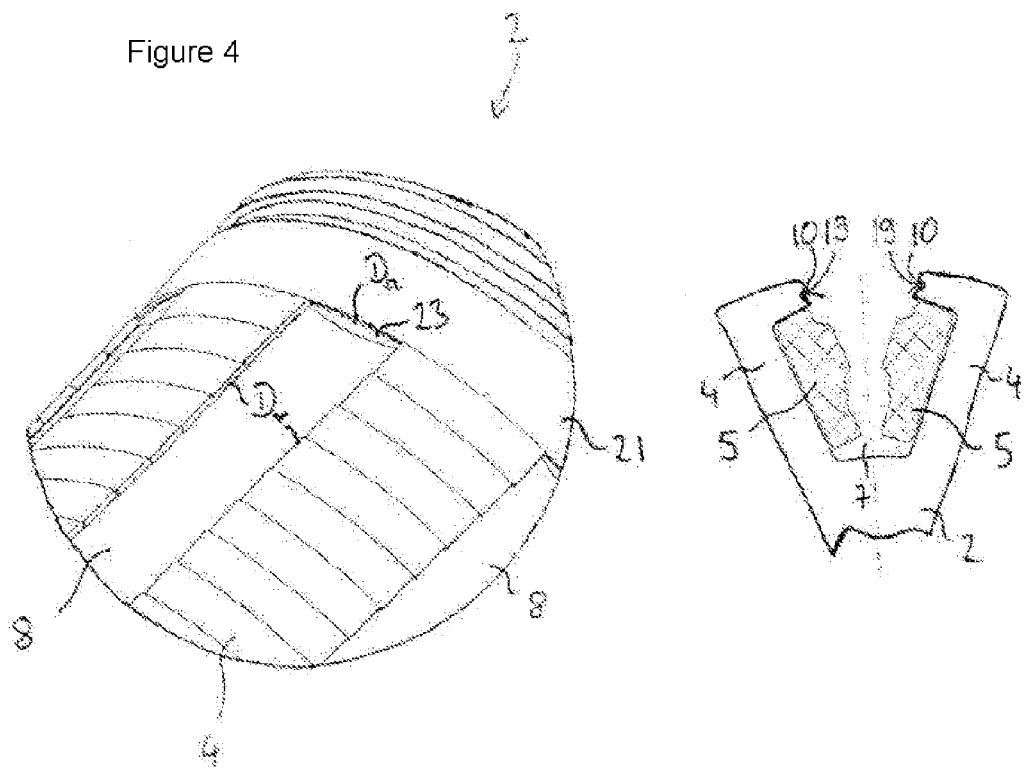
FIG. 4 is a schematic view of a perspective view and of a cross section through the rotor.

FIG. 4 shows the regions $D_r$ which are to be sealed radially and the region $D_a$ which is to be sealed axially, where the three rotor components rotor laminated core, groove wedge 8 and cover of the winding heads 21 meet. The sealing of these regions prevents casting compound or impregnating resin from escaping. The sealing cushions 15 are removed after the casting and can be used in further casting cycles.

Figure 5:
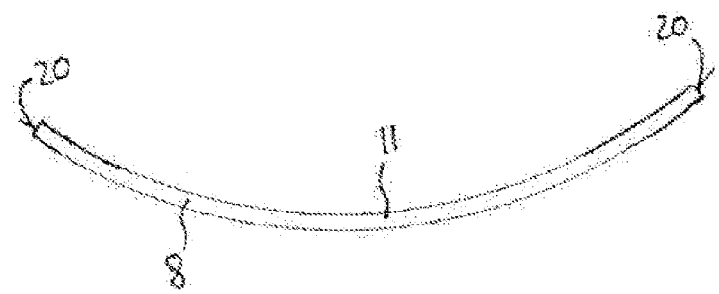
FIG. 5 is a schematic view of a cross section through the groove wedge.

An alternative possibility for preventing casting compound from escaping, which can also be used in addition to the sealing cushion 15, will now be described with reference to FIGS. 4 to 6.

In the radial sealing region $D_r$ a seal 19 can be provided in the recess 10. This seal 19 can be embodied as a liquid seal or as a sealing rail and can either be introduced into the recess 10 or else applied as a sealing bead to the side faces 20 of the groove wedge 8. For example silicone can be used for this.

Figure 6:
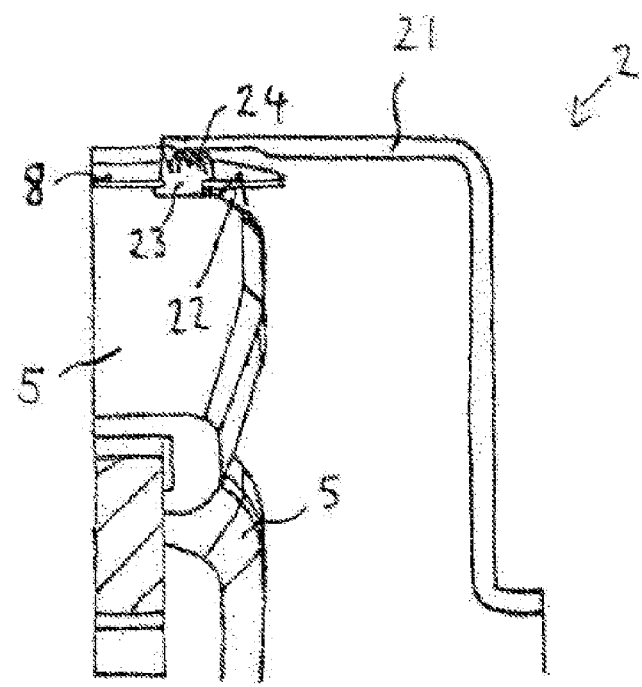
FIG. 6 is a schematic view of a longitudinal section through the rotor.

The region $D_a$ which is to be sealed axially can additionally be sealed off by a sealing plug 23 which is shown in section in figure 6. The sealing plug 23 is manufactured from a non-magnetizable material, for example from silicone or some other material, and can already be plugged on or integrally injection-molded onto the edge region 22 of the groove wedge 8 during the manufacture thereof. Alternatively, it can also be connected to the groove wedge 8 during the assembly of the rotor 2, either by pre-assembling both parts and subsequently joining them or by mounting the groove wedge 8 and subsequently fitting the sealing plug 23.

In the embodiment shown, the sealing plug 23 has compressible lamellas 24. The lamellas 24 compensate the assembly tolerances and fabrication tolerances of all components in the sealing region $D_a$.

During the assembly it is possible to adopt the following: Firstly, the groove wedges 8 are mounted with the sealing plug 23, and afterward the covers of the winding heads 21 are fitted on. In this context, the lamellas 24 of the sealing plugs 23 are pressed and therefore position themselves against the sealing contour. As a result, the region which is to be sealed is closed off. Even if the lamellas 24 are not positioned precisely against the cover of the winding head 21, at least one labyrinth seal is formed here. If the casting compound or the impregnating resin penetrates the first lamellas 24 during the casting or impregnation, it is therefore largely held back by the labyrinth geometry.

Although at least one exemplary embodiment has been shown in the preceding description, various changes and modifications can be made. The specified embodiments are merely examples and are not provided for limiting the scope of validity or the possibility of application or the configuration in any way. Instead, the preceding description provides the person skilled in the art with a plan for implementing at least an exemplary embodiment, wherein numerous changes in the function and the arrangement of elements described in an exemplary embodiment can be made without departing from the scope of protection of the appended claims and their legal equivalents.

In addition, a method for manufacturing a rotor 2 which is described in the above description may include the following method steps:

providing a rotor laminated core with exciter windings 5 and groove wedges 8 which cover the grooves 7;

fitting sealing cushions 15 onto the outer sides 27 of the groove wedges 8, wherein the sealing cushions 15 cover the outer sides 27 of the groove wedges 8 completely;

introducing the rotor 2 into a casting tool;

casting the rotor 2; and taking the rotor 2 out of the casting tool and removing the sealing cushions 15.

LIST OF REFERENCE NUMERALS

1 Electric motor
2 Rotor
3 Stator
4 Pole tooth
5 Exciter winding
6 Groove insulating paper
7 Groove
8 Groove wedge
9 Undercut
10 Recess
11 Bulge
14 Arrow
15 Sealing cushion
16 Surface
17 Surface
18 Side face
19 Seal
20 Side face
21 Cover of the winding head
22 Edge region
23 Sealing plug
24 Lamellas
25 Longitudinal side
26 End
27 Outer side

What is claimed is:

1. A rotor for a rotating electric machine, the rotor comprising:
   a plurality of pole teeth, each supporting an exciter winding;
   a groove formed between each pair of adjacent pole teeth; and
   a groove wedge arranged in each groove, wherein each groove wedge has a concave shape defining a bulge having an arc shape with a constant curvature radius directed toward an interior of the rotor.

2. The rotor of claim 1, wherein each groove wedge is securely clamped in the respective groove between the respective pair of adjacent pole teeth by an engagement of longitudinal sides of the groove wedge with the pair of pole teeth.

3. The rotor of claim 2, wherein each groove wedge has a seal on each longitudinal side engaged with a respective pole tooth.

4. The rotor of claim 1, comprising a sealing plug arranged between at least one lateral end of each groove wedge and an adjoining structure of the rotor.

5. The rotor of claim 4, wherein each sealing plug has flexible lamellas.

6. The rotor of claim 1, wherein each exciter winding is surrounded by a casting compound or an impregnating compound.

7. An electric motor, comprising:
   a rotor comprising:
      a plurality of pole teeth, each supporting an exciter winding;
      a groove formed between each pair of adjacent pole teeth; and
      a groove wedge arranged in each groove, wherein each groove wedge has a concave shape defining a bulge having an arc shape with a constant curvature radius directed toward an interior of the rotor.

8. The electric motor of claim 7, wherein each groove wedge of the rotor is securely clamped in the respective groove between the respective pair of adjacent pole teeth by an engagement of longitudinal sides of the groove wedge with the pair of pole teeth.

9. The electric motor of claim 8, wherein each groove wedge of the rotor has a seal on each longitudinal side engaged with a respective pole tooth.

10. The electric motor of claim 7, wherein the rotor comprises a sealing plug arranged between at least one lateral end of each groove wedge and an adjoining structure of the rotor.

11. The electric motor of claim 10, wherein each sealing plug has flexible lamellas.

12. The electric motor of claim 7, wherein each exciter winding of the rotor is surrounded by a casting compound or an impregnating compound.

13. A motor vehicle, comprising:
   an electric motor, comprising:
      a rotor comprising:
         a plurality of pole teeth, each supporting an exciter winding;
         a groove formed between each pair of adjacent pole teeth; and
         a groove wedge arranged in each groove, wherein each groove wedge has a concave shape defining a bulge having an arc shape with a constant curvature radius directed toward an interior of the rotor.

\* \* \* \* \*